United States Patent
Park et al.

(10) Patent No.: US 9,851,693 B2
(45) Date of Patent: Dec. 26, 2017

(54) METHOD AND APPARATUS FOR CORRECTING DISTORTION ON HOLOGRAPHIC DISPLAY

(71) Applicant: ELECTRONICS AND TELECOMMUNICATIONS RESEARCH INSTITUTE, Daejeon (KR)

(72) Inventors: Min Sik Park, Sejong (KR); Hyun Eui Kim, Cheongju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 107 days.

(21) Appl. No.: 15/007,389

(22) Filed: Jan. 27, 2016

(65) Prior Publication Data

US 2016/0223987 A1    Aug. 4, 2016

(30) Foreign Application Priority Data

Jan. 29, 2015  (KR) .................. 10-2015-0014580

(51) Int. Cl.
| | |
|---|---|
| G06K 9/00 | (2006.01) |
| G03H 1/04 | (2006.01) |
| G03H 1/08 | (2006.01) |
| G06F 3/01 | (2006.01) |
| G03H 1/22 | (2006.01) |

(52) U.S. Cl.
CPC ......... *G03H 1/0486* (2013.01); *G03H 1/0808* (2013.01); *G03H 1/2294* (2013.01); *G03H 2001/0825* (2013.01); *G03H 2226/05* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 8,379,079 B2 | 2/2013 | Kroll et al. | |
| 8,462,408 B2 * | 6/2013 | Kroll ..................... | G02B 5/045 359/9 |

(Continued)

FOREIGN PATENT DOCUMENTS

KR    10-2008-0035668 A    4/2008

OTHER PUBLICATIONS

Schwerdtner et al. (WO 2006/119920).*

(Continued)

*Primary Examiner* — Soo Park
(74) *Attorney, Agent, or Firm* — LRK Patent Law Firm

(57) ABSTRACT

A method and apparatus for correcting a distortion of a holographic display. The method includes tracking a location of a viewing window by tracking a location of a pupil of a user and calculating a central location of the viewing window, generating a wavefront aberration by determining an object point and an image point based on a location of a light source and the central location of the viewing window and using ray tracing, and calculating a complex aberration light field using the generated wavefront aberration. Thus, a quality of a holographically reproduced image in a viewing window-based holographic display may be improved.

18 Claims, 7 Drawing Sheets

(56) References Cited

U.S. PATENT DOCUMENTS

| | | | |
|---|---|---|---|
| 8,462,409 B2* | 6/2013 | Olaya | G02B 27/0093 348/40 |
| 9,116,505 B2* | 8/2015 | Schwerdtner | G02B 5/1876 |
| 9,436,158 B2* | 9/2016 | Kostuk | A61B 1/00163 |
| 2010/0033782 A1* | 2/2010 | Olaya | G02B 27/0093 359/9 |
| 2010/0296143 A1* | 11/2010 | Reichelt | G03H 1/02 359/32 |
| 2013/0113685 A1* | 5/2013 | Sugiyama | G02B 27/0093 345/32 |
| 2014/0055692 A1* | 2/2014 | Kroll | G02F 1/134309 349/15 |
| 2014/0192146 A1 | 7/2014 | Park et al. | |
| 2015/0103140 A1* | 4/2015 | Kostuk | A61B 1/00163 348/40 |

OTHER PUBLICATIONS

Reichelt et al., "Holographic 3-D displays—electro-holography within the grasp of commercialization", Advances in Lasers and Electro Optics, Apr. 2010.*

* cited by examiner

METHOD AND APPARATUS FOR CORRECTING DISTORTION ON HOLOGRAPHIC DISPLAY

TECHNICAL FIELD

Embodiments relate to a method and apparatus for correcting a distortion of a holographic display.

BACKGROUND ART

An existing viewing window-based digital holographic display may be used to concentrate a diffraction beam output from a spatial light modulator on a pupil of a user through a convergent optical system so that the user may view a holographically reproduced image.

Such a method may provide the spatial light modulator that is a main component included in the viewing window-based digital holographic display as a commercial liquid crystal display (LCD) panel suitable for a large screen despite a small diffraction angle due to a large pixel pitch. For example, the viewing window-based holographic display may provide a user with a large-screen hologram image with a wide viewing angle using an existing commercial LCD panel in lieu of a high-performance spatial light modulator and by moving a viewing window based on a location of a pupil of the user.

However, the convergent optical system of the digital holographic display that may concentrate a diffraction beam to generate a viewing window may have an optical aberration, and thus a distortion may occur in a holographically reproduced image observed through the viewing window.

Such a distortion may drastically degrade a quality of a stereoscopically reproduced image, and thus using the viewing window-based holographic display as a commercial three-dimensional (3D) stereoscopic video display may not be easy. Further, when using a spatial light modulator having a large screen to provide a large-screen holographic display, a size of an aperture of a convergent optical system may increase as the size of the screen of the spatial light modulator increases. Thus, when using the convergent optical system, a plurality of lens having a large aperture may need to be used, and thus a cost of production may increase and a volume may also increase.

DISCLOSURE

Technical Goals

An aspect of the present disclosure provides a method and apparatus for correcting a distortion of a holographic display to tackle issues described above.

Another aspect of the present disclosure provides a method and apparatus for correcting a distortion of a holographic display to improve a quality of a holographically reproduced image in a viewing window-based holographic display.

Still another aspect of the present disclosure provides a method and apparatus for correcting a distortion of a holographic display to correct a distortion of a holographically reproduced image only through computer calculations without an additional device in a viewing window-based holographic display.

Technical Solutions

Technical aspects of the present disclosure are provided as follows to achieve objectives and characteristic effects of the present disclosure.

According to an aspect of the present disclosure, there is provided a method of correcting a distortion of a holographic display to be performed by an apparatus for correcting a distortion of a holographic display, the method including tracking a location of a viewing window by calculating a central location of the viewing window based on a location of a pupil of a user, generating a wavefront aberration by determining an object point and an image point based on a location of a light source and the central location of the viewing window, and using ray tracing, and correcting a distortion of a holographic display using the generated wavefront aberration.

The method may further include generating a computer-generated hologram (CGH) in which the distortion is corrected using a calculated complex light field, and reproducing a hologram by encoding the CGH based on a spatial light modulator.

The tracking of the location of the viewing window may include calculating the central location of the viewing window by tracking the location of the pupil using a pupil image of the user obtained from an image sensor.

The generating of the wavefront aberration may include generating the wavefront aberration by determining the central location of the viewing window to be the image point and determining a point source on an optical axis to be the object point.

The generating of the wavefront aberration may include generating the wavefront aberration in an exit pupil using ray tracing of an optical system of the holographic display. The optical system may be a convergent optical system, and the exit pupil may be an exit pupil of the convergent optical system. The generating of the wavefront aberration may include generating a wavefront aberration of coordinates of the exit pupil by calculating a first optical path spanning from an image point on an image plane to the exit pupil and a second optical path spanning from a reference spherical wavefront of the exit pupil to the central location of the viewing window.

The generating of the wavefront aberration may include generating a wavefront aberration of the convergent optical system of all coordinates of the exit pupil by calculating a difference between the first optical path and the second optical path.

The correcting of the distortion may include correcting the distortion of the holographic display by calculating a complex aberration light field by multiplying an aberration light field in which the wavefront aberration is a negative value.

When an object to be displayed is a stereoscopic object, the calculating of the complex aberration light field may include dividing the object into successive object planes, calculating a complex aberration light field of each object plane, and calculating a sum of calculated respective complex aberration light fields.

The generating of the CGH may include generating the CGH by calculating a corrected light field value of an object on a spatial light modulator plane. The reproducing of the hologram may include reproducing the hologram for a stereoscopic image to be formed in a space by transforming a light field value of the object on the spatial light modulator plane based on an optical modulation characteristic of the spatial light modulator, and performing optical modulation.

According to another aspect of the present disclosure, there is provided an apparatus for correcting a distortion of a holographic display, the apparatus including a viewing window location tracker configured to track a location of a pupil of a user and calculate a central location of a viewing window, a wavefront aberration generator configured to generate a wavefront aberration by determining an object point and an image point based on a location of a light source and the central location of the viewing window, and using ray tracing, and a complex aberration light field calculator configured to calculate a complex aberration light field using the generated wavefront aberration.

The apparatus may further include a CGH generator configured to generate a CGH in which a distortion is corrected using the calculated complex light field, and a hologram display configured to reproduce a hologram by encoding the CGH based on a spatial light modulator.

The viewing window location tracker may calculate the central location of the viewing window by obtaining a pupil image of the user from an image sensor, performing image processing, and tracking the location of the pupil.

The wavefront aberration generator may generate the wavefront aberration by determining the central location of the viewing window to be the image point and determining a point source on an optical axis to be the object point.

The wavefront aberration generator may generate a wavefront aberration in an exit pupil using ray tracing of an optical system of the holographic display.

The optical system may be a convergent optical system, and the exit pupil may be an exit pupil of the convergent optical system. The wavefront aberration generator may generate a wavefront aberration of coordinates of the exit pupil by calculating a first optical path spanning from an image point on an image plane to the exit pupil and a second optical path spanning from a reference spherical wavefront of the exit pupil to the central location of the viewing window.

The wavefront aberration generator may generate a wavefront aberration of the convergent optical system of all coordinates of the exit pupil by calculating a difference between the first optical path and the second optical path.

The complex aberration light field calculator may calculate a complex aberration light field by multiplying an aberration light field in which the wavefront aberration is a negative value.

When an object to be displayed is a stereoscopic object, the complex aberration light field calculator may calculate the complex aberration light field by dividing the object into successive object planes, calculating a complex aberration light field of each object plane, and calculating a sum of the calculated respective complex aberration light fields.

The CGH generator may generate the CGH by calculating a corrected light field value of an object on a spatial light modulator plane, and the hologram display may reproduce a hologram for a stereoscopic image to be formed in a space by transforming the light field value of the object on the spatial light modulator plane based on an optical modulation characteristic of the spatial light modulator, and performing optical modulation.

Advantageous Effects

According to example embodiments, a quality of a holographically reproduced image in a viewing window-based holographic display may be improved.

According to example embodiments, a distortion of a holographically reproduced image may be corrected only through computer calculations without an additional device.

According to example embodiments, a quality of a holographically reproduced image may be improved by correcting a distortion of the holographically reproduced image, and thus a viewing window-based holographic display may be used as a commercial three-dimensional (3D) stereoscopic video display.

BEST MODE FOR CARRYING OUT INVENTION

Hereinafter, example embodiments of the present disclosure will be described in detail with reference to the accompanying drawings.

Figure 1:
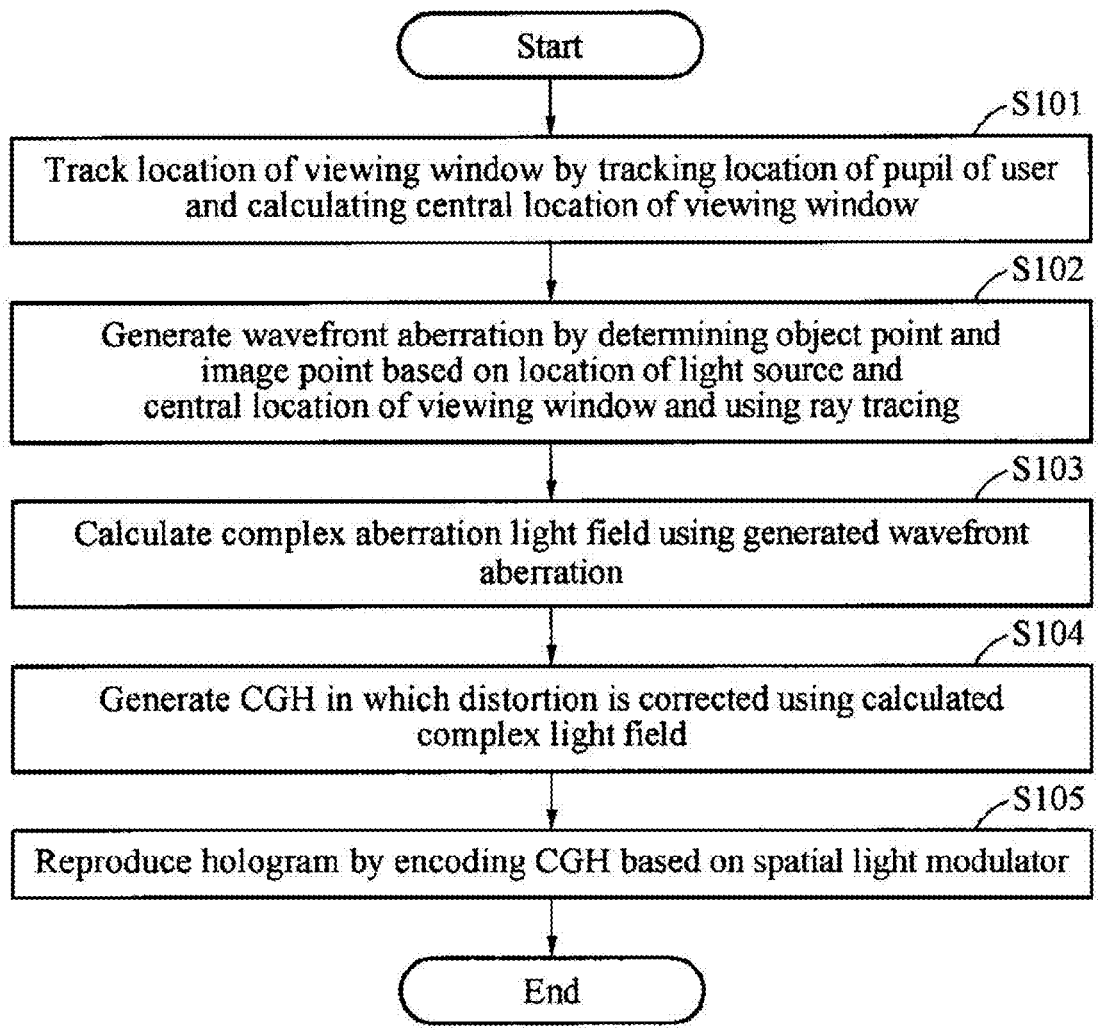
FIG. 1 is a flowchart illustrating an example of a method of correcting a distortion of a holographic display according to an embodiment.

FIG. 1 is a flowchart illustrating an example of a method of correcting a distortion of a holographic display according to an embodiment.

The method of correcting a distortion of a holographic display, hereinafter simply referred to as a holographic display distortion correcting method, may be performed by an apparatus for correcting a distortion of a holographic display, hereinafter simply referred to as a holographic display distortion correcting apparatus.

In operation S101, the holographic display distortion correcting apparatus tracks a location of a viewing window by tracking a location of a pupil of a user and calculating a central location of the viewing window.

In detail, the holographic display distortion correcting apparatus may track the location of the pupil by obtaining a pupil image of the user from an image sensor and performing image processing, and calculate the central location of the viewing window.

In operation S102, the holographic display distortion correcting apparatus generates a wavefront aberration by determining an object point and an image point based on a location of a light source and the central location of the viewing window, and using ray tracking.

In detail, the holographic display distortion correcting apparatus may generate the wavefront aberration by determining the central location of the viewing window to be the image point and determining a point source on an optical axis to be the object point. In addition, the holographic display distortion correcting apparatus may generate a wavefront aberration in an exit pupil using ray tracing of an optical system of a holographic display device. Here, the optical system may be a convergent optical system, and the exit pupil may be an exit pupil of the convergent optical system.

Further, the holographic display distortion correcting apparatus may generate a wavefront aberration of coordinates of the exit pupil by calculating a first optical path, which is a distance between an image point on an image plane and the exit pupil, and calculating a second optical path, which is a distance between a reference spherical wavefront of the exit pupil and the central location of the viewing window. The holographic display distortion correcting apparatus may also generate a wavefront aberration of the convergent optical system of all coordinates of the exit pupil by calculating a difference between the first optical path and the second optical path.

In operation S103, the holographic display distortion correcting apparatus calculates a complex aberration light field using the generated wavefront aberration.

Here, the holographic display distortion correcting apparatus may calculate the complex aberration light field by multiplying an aberration light field in which the wavefront aberration is a negative value. As necessary, when an object to be displayed is a stereoscopic object, the holographic display distortion correcting apparatus may calculate the complex aberration light field by dividing the object into successive object planes, calculating respective complex aberration light fields, and calculating a sum of the calculated respective complex aberration light fields.

In operation S104, the holographic display distortion correcting apparatus generates a computer-generated hologram (CGH) in which a distortion is corrected using the calculated complex light field.

Here, the holographic display distortion correcting apparatus may generate the CGH by calculating a corrected light field value of an object in which a distortion is corrected on a spatial light modulator plane.

In operation S105, the holographic display distortion correcting apparatus reproduces a hologram by encoding the CGH based on a spatial light modulator.

In detail, the holographic display distortion correcting apparatus may transform a light field value of the object on the spatial light modulator plane based on an optical modulation characteristic of the spatial light modulator.

Figure 2:
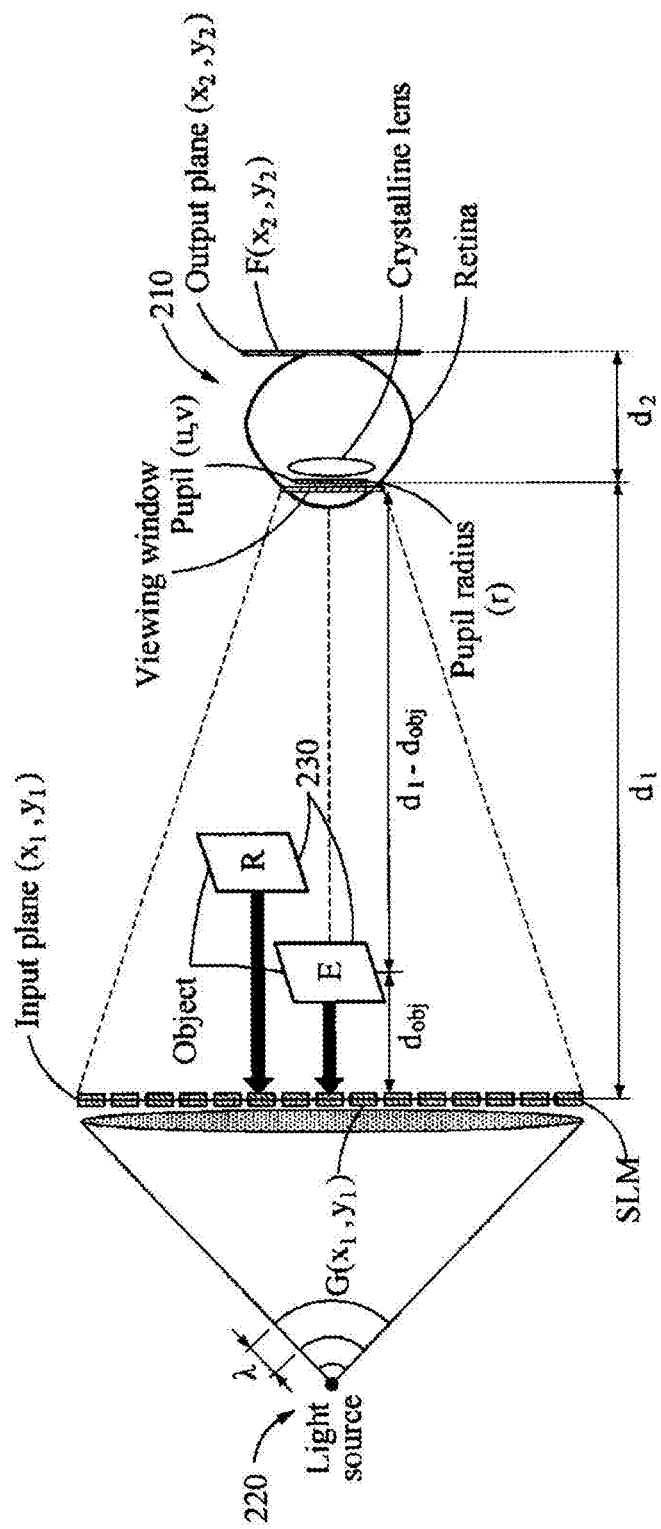
FIG. 2 is a diagram illustrating a model for calculating a light field value on a viewing window-based holographic display based on a pupil of a user in a method of correcting a distortion of a holographic display according to an embodiment.

FIG. 2 is a diagram illustrating a model for calculating a light field value on a viewing window-based holographic display based on a pupil of a user in a holographic display distortion correcting method according to an embodiment.

Referring to FIG. 2, a light field value diffracted based on a distance of an object on a viewing window-based holographic display based on a pupil of a user may be calculated. For example, a diffraction calculation model may be used for a Fresnel transformation and an inverse Fresnel transformation.

A CGH pattern generated by a holographic display distortion correcting method may control a refraction direction of a plane wave emitted from a laser light source and optically restore a hologram in a free space.

According to an embodiment, a holographic display distortion correcting apparatus may generate a CGH pattern to be on a holographic display. For example, the holographic display distortion correcting apparatus may align a center of a pupil of a user and a center of a viewing window in a z-axis direction. In addition, when a user views a spatial light modulator (SLM), the holographic display distortion correcting apparatus may allow a light field passing through an input plane $(x_1, y_1)$ of the spatial light modulator from a light source 220 and propagated to a pupil $(u, v)$ to be restored as an object image on an output plane $(x_2, y_2)$ of a retina.

For example, the Fresnel transformation may be represented by Equation 1 below.

$$F(x_2, y_2) = \frac{1}{(j\lambda d_1)(j\lambda d_2)} \exp\left(j\frac{\pi}{\lambda d_2}(x_2^2 + y_2^2)\right) \quad \text{[Equation 1]}$$
$$\int\int \left[\exp\left(j\frac{\pi}{\lambda}\left(\frac{1}{d_1} + \frac{1}{d_2} - \frac{1}{f}\right)(u^2 + v^2)\right) \text{circ}\left(\frac{u^2 + v^2}{r^2}\right)\right.$$
$$\int\int \exp\left(j\frac{\pi}{\lambda d_1}(x_1^2 + y_1^2)\right) G(x_1, y_1)$$
$$\exp\left(-j\frac{2\pi}{\lambda d_1}(x_1 u + y_1 v)\right) dx_1 dy_1 \Big]$$
$$\exp\left(-j\frac{2\pi}{\lambda d_2}(u x_2 + v y_2)\right) du dv$$

In Equation 1, "$G(x_1, y_1)$" denotes a light field distribution of an object on a spatial light modulator plane, and "$F(x_2, y_2)$" denotes a light field distribution on a retina. The light field $G(x_1, y_1)$ of the object in a free space may be propagated and the light field $F(x_2, y_2)$ may be formed on the retina. In addition, parameters "$\lambda$," "$d_1$," "$d_2$," "$d_{obj}$," and "f" denote a light source wavelength, a viewing window distance, a distance between a pupil and the retina, a distance between the spatial light modulator and the object, and a focal length of a crystalline lens, respectively.

In addition, the focal length f may be derived from a Gaussian function "$\{(d_1 - d_{obj}) \times d_2\} / \{(d_1 - d_{obj}) + d_2\}$." Here, the focal length f may change to adjust a focus of the object in the retina based on a distance between the object and the user by the holographic display distortion correcting apparatus.

In a function "$\text{circ}((u^2 + v^2)/r^2)$," "r" denotes a radius of the pupil, and may be a finite size of the pupil to eliminate zero-order diffraction noise and a twin image generated from a lattice structure of a display panel. The display panel may be a liquid crystal display (LCD) panel, but not limited thereto.

Figure 3A:
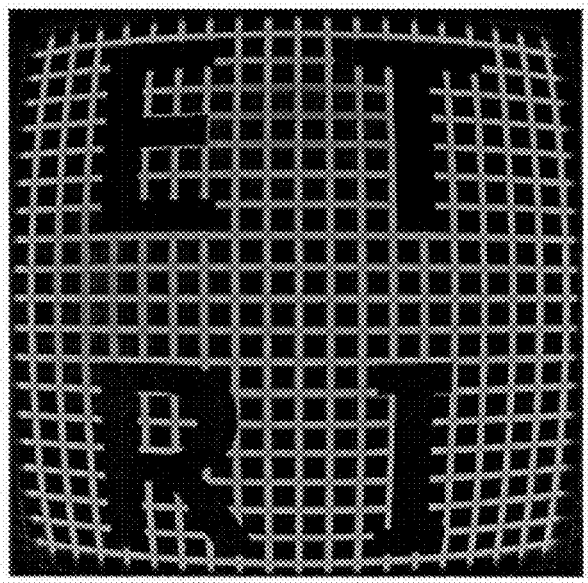
FIG. 3A is a holographically reproduced image in which a distortion is generated when reproducing the holographically reproduced image on a viewing window-based holographic display according to an embodiment.

FIG. 3A is a holographically reproduced image in which a distortion is generated when reproducing the holographically reproduced image on a viewing window-based holographic display according to an embodiment.

Figure 3B:
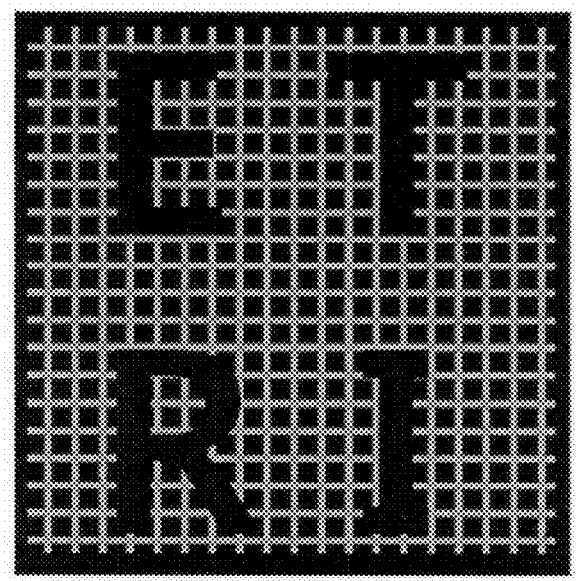
FIG. 3B is a holographically reproduced image in which a distortion is corrected when reproducing the holographically reproduced image on a viewing window-based holographic display according to an embodiment.

FIG. 3B is a holographically reproduced image in which a distortion is corrected when reproducing the holographically reproduced image on a viewing window-based holographic display according to an embodiment.

Equation 2 below may represent an inverse Fresnel transformation derived from Equation 1.

$$G(x_1, y_1) = \frac{1}{(-j\lambda d_1)} \frac{1}{(-j\lambda d_2)} \exp\left\{-j\frac{2\pi}{\lambda}(d_1 + d_2)\right\} \times \quad \text{[Equation 2]}$$
$$\int\int_{-\infty}^{\infty} \exp\left\{-j\frac{2\pi}{\lambda}\left(\frac{1}{d_1} + \frac{1}{d_2} - \frac{1}{f}\right)\frac{u^2 + v^2}{2}\right\} \times$$
$$\left[\int\int_{-\infty}^{\infty} F(x_2, y_2) \exp\left\{-j\frac{2\pi}{\lambda}\frac{(x_2^2 + y_2^2)}{2d_2}\right\} \times \right.$$

$$\exp\left\{j2\pi\left(\frac{u}{\lambda d_2}x_2 + \frac{v}{\lambda d_2}y_2\right)\right\}dx_2 dy_2\right] \times$$

$$\exp\left\{j2\pi\left(\frac{x_1}{\lambda d_1}u + \frac{y_1}{\lambda d_1}v\right)\right\}du dv$$

A holographic display distortion correcting apparatus may generate a CGH pattern to be on a display panel through inverse propagation from a retina to a spatial light modulator plane. Here, the display panel may be an LCD panel, but not limited thereto.

Since the holographic display distortion correcting apparatus changes a focal length of a crystalline lens for an object to be formed as a focus on a retina, "$F(x_2,y_2)$" may be a light field of the object.

The holographic display distortion correcting apparatus may generate the CGH from the light field calculated based on Equation 2. A holographically reproduced image that is formed on a retinal plane when restoring the image on the viewing window-based holographic display may have a distortion as illustrated in FIG. 3A. Here, the holographic display distortion correcting apparatus may calculate a wavefront aberration in an exit pupil using ray tracing of an optical system of the viewing window-based holographic display to correct the distortion in the holographically reproduced image.

The holographic display distortion correcting apparatus may calculate a wavefront aberration value using Equation 3 below under the assumption that a wavefront aberration value expressed by a polar coordinate system in which a radius is "$\rho$" and an azimuthal angle is "$\theta$" is "$W(\rho,\theta)$."

$$W_{n,m} = \frac{1}{\pi}\int_0^1\int_0^{2\pi} W(\rho,\theta)\cdot Z_{n,m}(\rho,\theta)d\theta\rho d\rho \qquad \text{[Equation 3]}$$

For example, the holographic display distortion correcting apparatus may calculate "$W_{n,m}$," which is a Zernike coefficient with an n-th order and a frequency m.

As necessary, the holographic display distortion correcting apparatus may use a Zernike polynomial $Z_{n,m}(\rho,\theta)$ and $W_{n,m}$, based on Equation 4 below.

$$W(\rho,\theta) = \sum_{n}^{\infty}\sum_{m=-n}^{n} W_{n,m} Z_{n,m}(\rho,\theta) \qquad \text{[Equation 4]}$$

The holographic display distortion correcting apparatus may calculate a light field value $P(\rho,\theta)$ as a wavefront aberration value using Equation 5 below.

$$P(\rho,\theta) = A(\rho,\theta)e^{jkW(\rho,\theta)} \qquad \text{[Equation 5]}$$

In addition, the holographic display distortion correcting apparatus may calculate a light field value $G'(x_1,y_1)$ of an object obtained by correcting a wavefront aberration, using Equations 1 and 5, and Equation 6 below.

$$G'(x_1,y_1) = G(x_1,y_1) \times P'(\rho,\theta) \qquad \text{[Equation 6]}$$

In Equation 6, "$P'(\rho,\theta)$" denotes a light field value of a wavefront aberration obtained by inputting a negative value of $W(\rho,\theta)$ to Equation 5 by the holographic display distortion correcting apparatus. The holographic display distortion correcting apparatus may generate a CGH from the light field value $G'(x_1,y_1)$ of the object obtained by correcting the wavefront aberration.

In addition, the holographic display distortion correcting apparatus may reproduce a hologram image to be formed on a retinal plane by restoring the image on the viewing window-based holographic display. Here, the holographically reproduced image formed on the retinal plane is a hologram image in which a distortion is corrected as illustrated in FIG. 3B.

Figure 4:
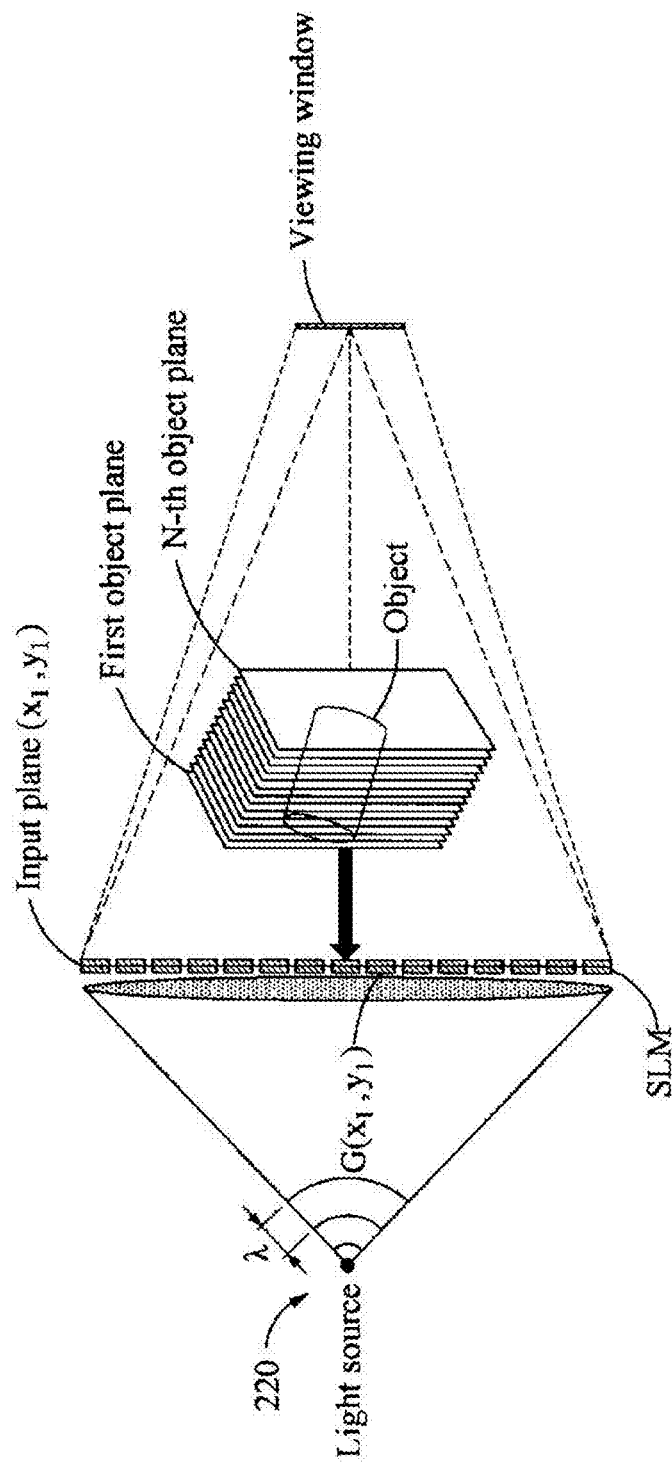
FIG. 4 is a diagram illustrating a method of correcting a distortion of a stereoscopic object in a holographic display according to an embodiment.

FIG. 4 is a diagram illustrating a method of correcting a distortion of a stereoscopic object in a holographic display according to an embodiment.

According to an embodiment, an object may be planar, or stereoscopic, as necessary. Here, as necessary, a holographic display distortion correcting apparatus may divide the stereoscopic object into successive object planes and recognize the respective planes.

Referring to FIG. 4, a stereoscopic object is divided into N object planes.

A light field of the stereoscopic object calculated by the holographic display distortion correcting apparatus may be a sum of light fields $G'(x_1,y_1;z_1)$ calculated on an input plane, from a first object plane through an N-th object plane.

For example, when a distance from the input plane to an i-th object plane is $z_i$, the holographic display distortion correcting apparatus may calculate a diffraction light field $G''(x_1,y_1)$ of the stereoscopic object on a spatial light modulator (SLM) plane.

According to an embodiment, the holographic display distortion correcting apparatus may calculate the light field of the stereoscopic object through discretization of the successive object planes of the stereoscopic object to be discrete object planes. Here, the holographic display distortion correcting apparatus may calculate respective light fields of the object planes, and calculate a sum thereof using Equation 7 below.

$$G''(x_1,y_1) = \sum_{i=1}^{N} G'(x_i,y_i;z_i) \qquad \text{[Equation 7]}$$

Figure 5:
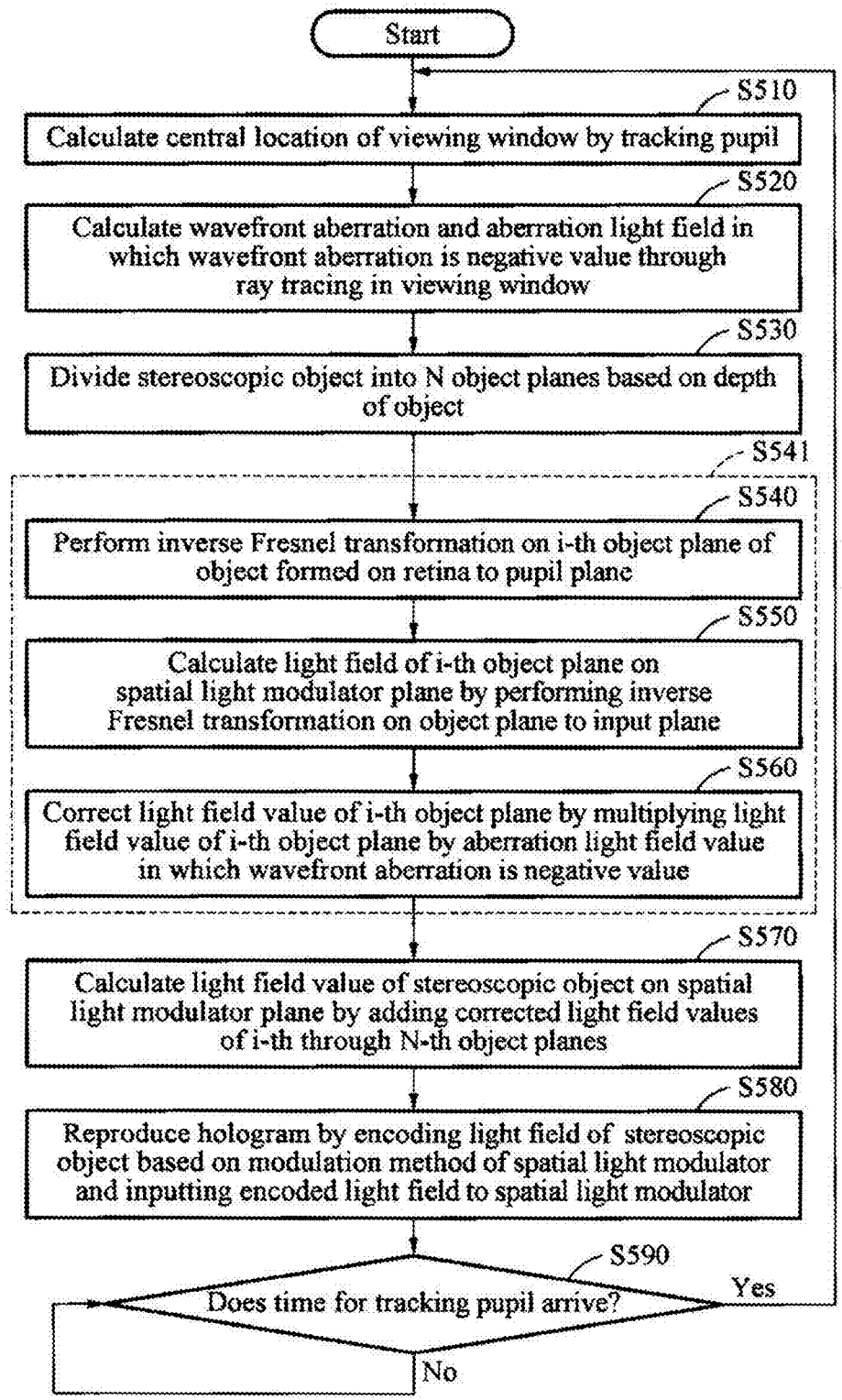
FIG. 5 is a flowchart illustrating another example of a method of correcting a distortion of a holographic display according to an embodiment.

FIG. 5 is a flowchart illustrating another example of a holographic display distortion correcting method according to an embodiment.

Referring to FIG. 5, a holographic display distortion correcting apparatus may correct a distortion of a holographically reproduced image on a viewing window-based holographic display.

In operation S510, the holographic display distortion correcting apparatus calculates a central location of a viewing window by tracking a pupil of a user after receiving a pupil image of the user as an input.

In operation S520, the holographic display distortion correcting apparatus calculates a wavefront aberration and a light field value in which the wavefront aberration is a negative value through ray tracing from a location of the viewing window.

In operation S530, the holographic display distortion correcting apparatus divides a stereoscopic object into N object planes.

In operations S540 and S550, the holographic display distortion correcting apparatus performs an inverse Fresnel transformation using Equation 2 to calculate a light field diffracted from each object plane up to a spatial light modulator plane.

In operation S560, the holographic display distortion correcting apparatus corrects a light field value of an i-th object plane by multiplying the light field value of the i-th object plane on the spatial light modulator plane by a calculated aberration light field value. Here, the holographic display distortion correcting apparatus may perform operations S540 through S560 on the i-th through N-th object planes.

In operation S570, the holographic display distortion correcting apparatus calculates a light field value of the stereoscopic object on the spatial light modulator plane by calculating a sum of corrected respective light fields of the i-th through N-th object planes.

In operation S580, the holographic display distortion correcting apparatus reproduces a hologram image by encoding the calculated light field of the stereoscopic object based on a modulation method of the spatial light modulator and inputting the encoded light field to the spatial light modulator.

In operation S590, the holographic display distortion correcting apparatus repetitively performs operations S510 through S590 by receiving a pupil image as an input at predetermined intervals to track a movement of the pupil of the user.

Figure 6:
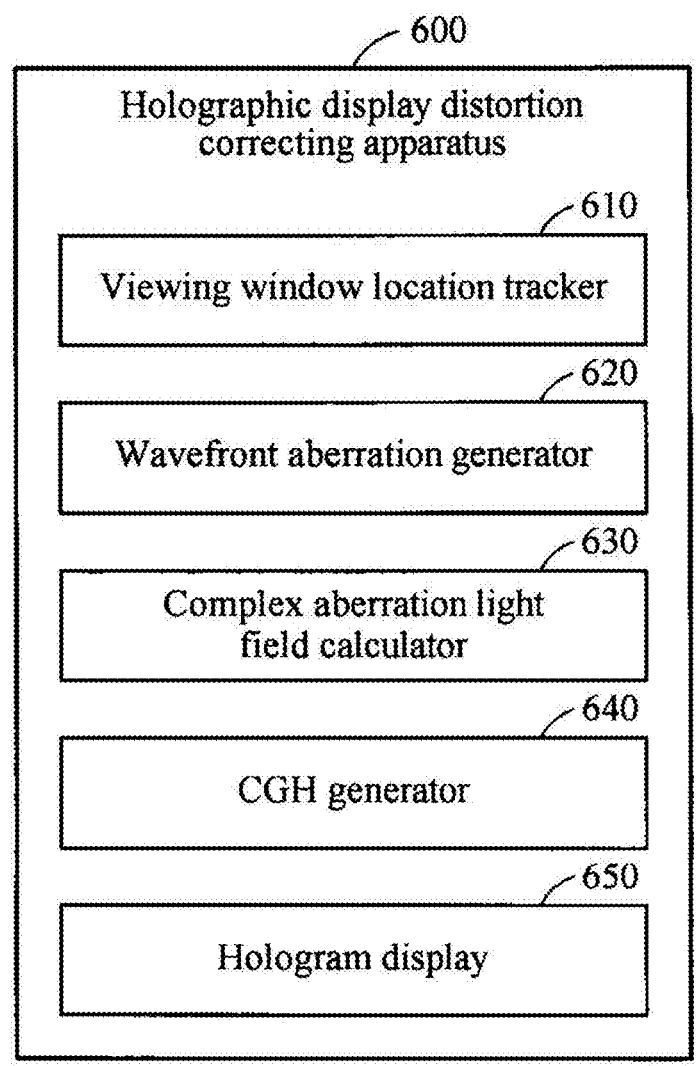
FIG. 6 is a diagram illustrating an example of an apparatus for correcting a distortion of a holographic display according to an embodiment.

FIG. 6 is a diagram illustrating an example of a holographic display distortion correcting apparatus according to an embodiment.

Referring to FIG. 6, a holographic display distortion correcting apparatus 600 includes a viewing window location tracker 610, a wavefront aberration generator 620, a complex aberration light field calculator 630, a CGH generator 640, and a hologram display 650. The viewing window location tracker 610, the wavefront aberration generator 620, the complex aberration light field calculator 630, the CGH generator 640, and the hologram display 650 may include at least one of a processor, a memory, a data transceiver. In addition, the viewing window location tracker 610, the wavefront aberration generator 620, the complex aberration light field calculator 630, the CGH generator 640, and the hologram display 650 may include a sensor, an electronic circuit, an electric circuit, and an integrated circuit (IC), but not limited thereto.

The viewing window location tracker 610 may track a location of a pupil of a user and calculate a central location of a viewing window. In detail, the viewing window location tracker 610 may track the location of the pupil by obtaining a pupil image of the user from an image sensor and performing image processing, and calculate the central location of the viewing window.

The wavefront aberration generator 620 may generate a wavefront aberration by determining an object point and an image point based on a location of a light source and the central location of the viewing window and using ray tracing.

In detail, the wavefront aberration generator 620 may generate the wavefront aberration by determining the central location of the viewing window to be the image point, and determining a point source on an optical axis to be the object point. In addition, the wavefront aberration generator 620 may generate a wavefront aberration in an exit pupil using ray tracing of an optical system of a holographic display device. Here, the optical system may be a convergent optical system, and the exit pupil may be an exit pupil of the convergent optical system.

The wavefront aberration generator 620 may generate a wavefront aberration of coordinates of the exit pupil by calculating a first optical path, which is a distance from an image point on an image plane to the exit pupil, and calculating a second optical path, which is a distance from a reference spherical wavefront of the exit pupil to the central location of the viewing window. Here, the wavefront aberration generator 620 may generate a wavefront aberration of the convergent optical system of all coordinates of the exit pupil by calculating a difference between the first optical path and the second optical path.

The complex aberration light field calculator 630 may calculate a complex aberration light field using the generated wavefront aberration.

As necessary, the complex aberration light field calculator 630 may calculate the complex aberration light field by multiplying an aberration light field in which the wavefront aberration is a negative value. For example, when an object to be displayed is a stereoscopic object, the complex aberration light field calculator 630 may calculate the aberration light field by dividing the object into successive objected plans, calculating each complex aberration light field, and calculating a sum of respective complex aberration light fields.

The CGH generator 640 may generate a CGH in which a distortion is corrected using the calculated complex light field. The CGH generator 640 may generate the CGH by calculating a corrected light field value of an object on a spatial light modulator plane.

The hologram display 650 may reproduce a hologram by encoding the CGH based on the spatial light modulator. In detail, the hologram display 650 may transform the light field value of the object on the spatial light modulator plane based on an optical modulation characteristic of the spatial light modulator, and reproduce the hologram to form a stereoscopic image in a space through optical modulation.

Figure 7:
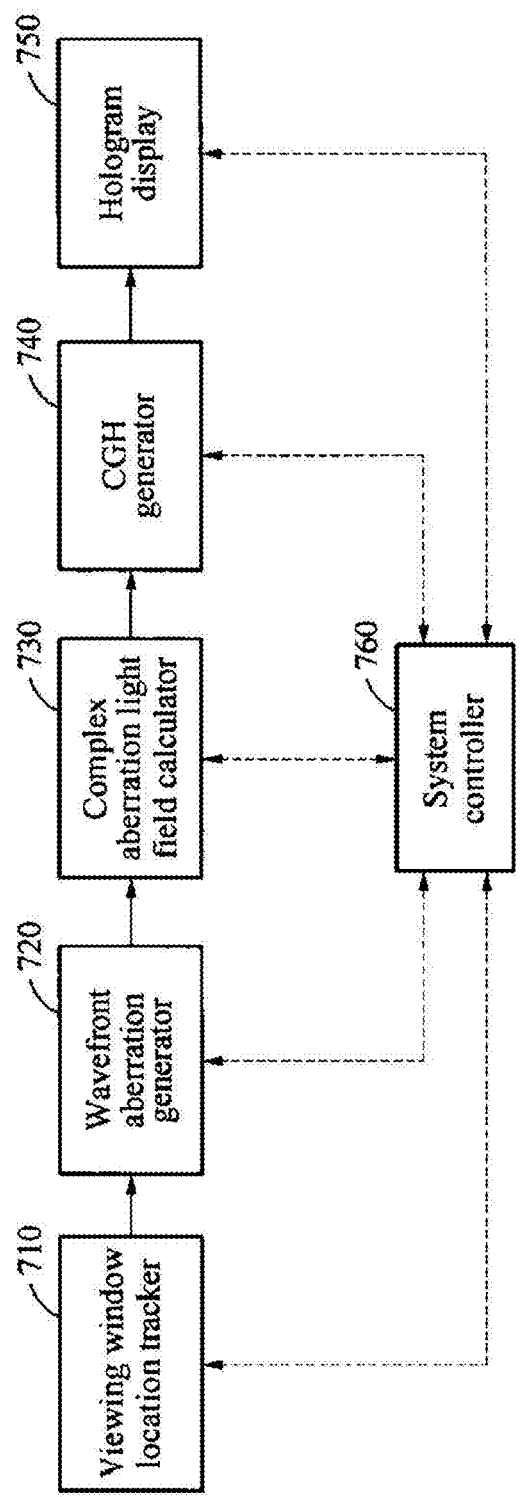
FIG. 7 is a diagram illustrating another example of an apparatus for correcting a distortion of a holographic display according to an embodiment.

FIG. 7 is a diagram illustrating another example of a holographic display distortion correcting apparatus according to an embodiment.

A viewing window-based holographic display system that may correct a distortion of a holographically reproduced image is illustrated.

Referring to FIG. 7, a viewing window-based holographic display distortion correcting apparatus includes a viewing window location tracker 710, a wavefront aberration generator 720, a complex aberration light field calculator 730, a CGH generator 740, a hologram display 750, and a system controller 760. The viewing window location tracker 710, the wavefront aberration generator 720, the complex aberration light field calculator 730, the CGH generator 740, the hologram display 750, and the system controller 760 may include at least one of a processor, a memory, and a data transceiver. In addition, the viewing window location tracker 710, the wavefront aberration generator 720, the complex aberration light field calculator 730, the CGH generator 740, the hologram display 750, and the system controller 760 may include a sensor, an electronic circuit, an electric circuit, and an IC, but not limited thereto.

According to an embodiment, the wavefront aberration generator 720 and the complex aberration light field calculator 730 of the holographic display distortion apparatus may be included in the CGH generator 740.

The viewing window location tracker 710 may calculate a central location of a viewing window to be moved by tracking a location of a pupil of a user.

In detail, the viewing window location tracker 710 may calculate an accurate location of the pupil by receiving a pupil image of the user as an input from an image sensor such as, for example, a charge-coupled device/complementary metal-oxide-semiconductor (CCD/CMOS) camera and a time of flight (ToF) camera, and may obtain a central coordinate of the viewing window to be moved.

The wavefront aberration generator 720 may set a location of a light source and the central location of the viewing window to be an object point and an image point, respectively, and obtain a wavefront aberration through ray tracing.

In detail, the wavefront aberration generator 720 may recognize, as the image point, the central location of the viewing window obtained by the viewing window location tracker 710 and recognize, as the object point, a point source on an optical axis. In addition, the wavefront aberration generator 720 may obtain an optical path spanning from the image point formed on an image plane to an exit pupil of a convergent optical system through the ray tracing by the convergent optical system of the viewing window-based holographic display. Further, the wavefront aberration generator 720 may obtain a wavefront aberration of the convergent optical system on all coordinates of the exit pupil by obtaining an optical path spanning from a reference spherical wavefront of the exit pupil to the central location of the viewing window and calculating a difference between the two optical paths.

The complex aberration light field calculator 730 may calculate a complex aberration light field value using a wavefront aberration value.

In detail, the complex aberration light field calculator 730 may calculate the wavefront aberration value calculated by the wavefront aberration generator 720 as a light field value using Equation 5.

The CGH generator 740 may calculate a CGH value in which a distortion is corrected using a complex aberration light field value.

In detail, the CGH generator 740 may calculate a corrected light field value of an object in which a distortion is corrected on a spatial light modulator plane from the aberration light field value calculated by the complex aberration light field calculator 730 using Equations 2, 6, and 7.

The hologram display 750 may reproduce a hologram by encoding the CGH corrected to be suitable for a modulation method of the spatial light modulator and inputting the encoded CGH.

In detail, the hologram display 750 may transform the light field value of the object on the spatial light modulator plane that is calculated by the CGH generator 740 based on an optical modulation characteristic of the spatial light modulator, for example, phase modulation, amplitude modulation, and complex modulation. In addition, the hologram display 750 may receive the input and perform the optical modulation to form a stereoscopic image in a space.

The system controller 760 may control the components described in the foregoing based on the location of the pupil of the user.

In detail, the system controller 760 may control the viewing window location tracker 710 to obtain a pupil image of the user and obtain central location information of the viewing window to move the location of the light source and move the viewing window. In addition, the system controller 760 may control the wavefront aberration generator 720, the complex aberration light field calculator 730, and the CGH generator 740 to generate a corrected CGH by newly calculating a wavefront aberration changed in a moved viewing window.

As described above, the viewing window-based holographic display distortion correcting apparatus may generate a CGH as input data of the spatial light modulator to reproduce a hologram on a viewing window-based large-screen holographic display. In addition, the viewing window-based holographic display distortion correcting apparatus may use a complex CGH obtained by calculating a light field obtained by an interference between a light field of an object and a light field of a reference wave based on a diffraction theory, and also use a complex light field value of a wavefront aberration calculated through ray tracing. Thus, the viewing window-based holographic display distortion correcting apparatus may correct a wavefront aberration distortion through a mathematical calculation based on simple computation without an additional distortion measuring and correcting device.

The units described herein may be implemented using hardware components and software components. For example, the hardware components may include microphones, amplifiers, band-pass filters, audio to digital converters, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A method of correcting a distortion of a holographic display to be performed by an apparatus for correcting a distortion of a holographic display, the method comprising:
   tracking a location of a viewing window by calculating a central location of the viewing window based on a location of a pupil of a user;
   generating a wavefront aberration by determining an object point and an image point based on a location of a light source and the central location of the viewing window, and using ray tracing; and
   correcting a distortion of a holographic display using the generated wavefront aberration,
   wherein the generating of the wavefront aberration comprises:
   generating the wavefront aberration in an exit pupil using ray tracing of an optical system of the holographic display; and
   generating the wavefront aberration of coordinates of the exit pupil by calculating a first optical path spanning from an image point on an image plane to the exit pupil and a second optical path spanning from a reference spherical wavefront of the exit pupil to the central location of the viewing window.

2. The method of claim 1, further comprising:
   generating a computer-generated hologram (CGH) in which the distortion is corrected using a calculated complex light field; and
   reproducing a hologram by encoding the CGH based on a spatial light modulator.

3. The method of claim 2, wherein:
   the generating of the CGH comprises generating the CGH by calculating a corrected, light field value of an object on a spatial light modulator plane, and
   the reproducing of the hologram comprises reproducing the hologram for a stereoscopic image to be formed in a space by transforming the light field value of the object on the spatial light modulator plane based on an optical modulation characteristic of the spatial light modulator, and performing optical modulation.

4. The method of claim 1, wherein the tracking of the location of the viewing window comprises:
   calculating the central location of the viewing window by tracking the location of the pupil using a pupil image of the user obtained from an image sensor.

5. The method of claim 1, wherein the generating of the wavefront aberration comprises:
generating the wavefront aberration by determining the central location of the viewing window to be the image point and determining a point source on an optical axis to be the object point.

6. The method of claim 1, wherein;
   the optical system is a convergent optical system, and
   the exit pupil is an exit pupil of the convergent optical system.

7. The method of claim 6, wherein the generating of the wavefront aberration comprises:
   generating a wavefront aberration of a convergent optical system of all coordinates of the exit pupil by calculating a difference between the first optical path and the second optical path.

8. A method of correcting a distortion of a holographic display to be performed by an apparatus for correcting a distortion of a holographic display, the method comprising:
   tracking a location of a viewing window by calculating a central location of the viewing window based on a location of a pupil of a user;
   generating a wavefront aberration by determining an object point and an image point based on a location of a light source and the central location of the viewing window, and using ray tracing; and
   correcting a distortion of a holographic display using the generated wavefront aberration,
   wherein the correcting of the distortion comprises:
   correcting the distortion of the holographic display by calculating a complex aberration light field by applying an aberration light field in which the wavefront aberration is a negative value.

9. The method of claim 8, wherein, when an object to be displayed is a stereoscopic object, the correcting of the distortion comprises:
   correcting the distortion of the holographic display by dividing the object into successive object planes and calculating a sum of respective complex aberration light fields.

10. An apparatus for correcting a distortion of a holographic display, the apparatus comprising:
    a processor; and
    a memory having instructions stored thereon executed by the processor to perform;
    tracking a location of a viewing window by calculating a central location of the viewing window based on a location of a pupil of a user;
    generating a wavefront aberration by determining an object point and an image point based on a location of a light source and the central location of the viewing window, and using ray tracing; and
    correcting a distortion of a holographic display by calculating a complex aberration light field using the generated wavefront aberration,
    wherein the wavefront aberration in an exit pupil is generated by using ray tracing of an optical system of the holographic display, and
    wherein the wavefront aberration of coordinates of the exit pupil is generated by calculating a first optical path spanning from an image point on an image plane to the exit pupil and a second optical path spanning from a reference spherical wavefront of the exit pupil to the central location of the viewing window.

11. The apparatus of claim 10,
    wherein the processor is further configured to:
    generate a CGH in which a distortion is corrected using a calculated complex light field; and reproduce a hologram by encoding the CGH based on a spatial light modulator.

12. The apparatus of claim 11, wherein the processor is further configured to:
generate the CGH by calculating a corrected light field value of an object on a spatial light modulator plane; and
reproduce a hologram for a stereoscopic image to be formed in a space by transforming a light, field value of the object on the spatial light modulator plane based on an optical modulation characteristic of the spatial light modulator, and performing optical modulation.

13. The apparatus of claim 10, wherein the processor is further configured to calculate the central location of the viewing window by tracking the location of the pupil using a pupil image of the user obtained from an image sensor.

14. The apparatus of claim 10, wherein the processor is further configured to generate the wavefront aberration by determining the central location of the viewing window to be the image point and determining a point source on an optical axis to be the object point.

15. The apparatus of claim 10, wherein:
the optical system is a convergent optical system, and
the exit pupil is an exit pupil of the convergent optical system.

16. The apparatus of claim 15, wherein the processor is further configured to generate a wavefront aberration of the convergent optical system of all coordinates of the exit pupil by calculating a difference between the first optical path and the second optical path.

17. The apparatus of claim 10, wherein the processor is further configured to calculate a complex aberration light, field by applying an aberration light field in which the wavefront aberration is a negative value.

18. The apparatus of claim 17, wherein, when an object to be displayed is a stereoscopic object, the processor is further configured to calculate the complex aberration light field by dividing the object into successive object planes, calculating a complex aberration light field of each object plane, and calculating, a sum of calculated respective complex aberration light fields.

* * * * *